J. H. SAUNDERS.
LAWN MOWER.
APPLICATION FILED APR. 25, 1916.
1,201,878.
Patented Oct. 17, 1916.
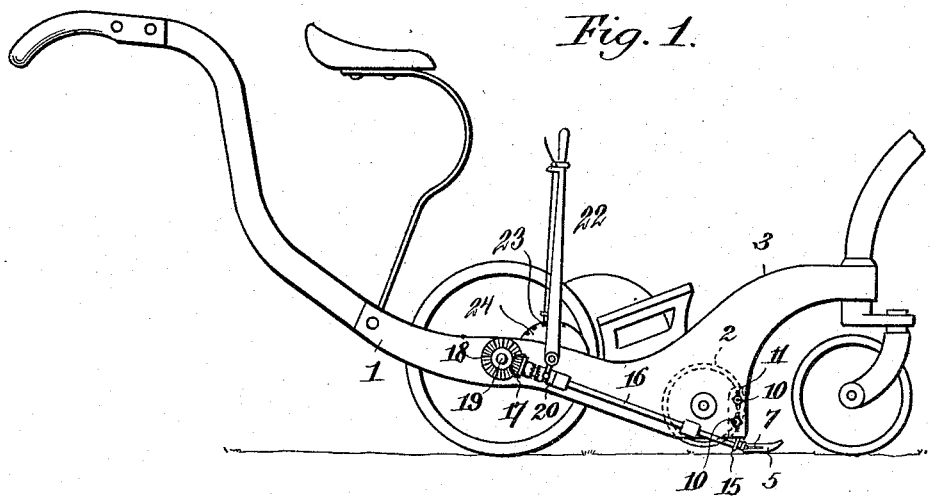
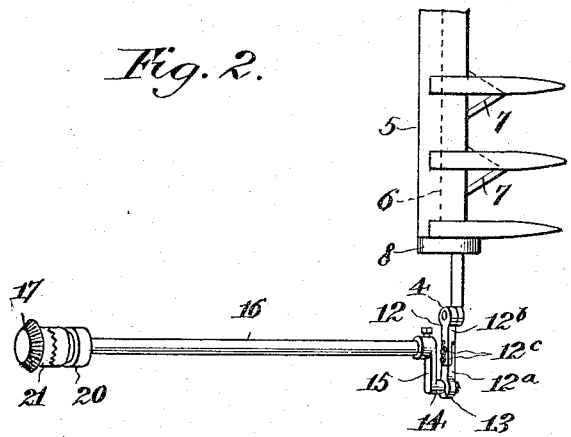
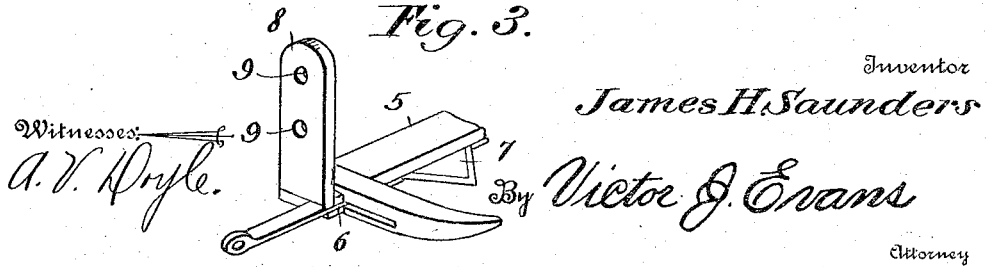
Witnesses:
A. V. Doyle.
Inventor
James H. Saunders
By Victor J. Evans
Attorney

UNITED STATES PATENT OFFICE.

JAMES H. SAUNDERS, OF NEW YORK, N. Y.

LAWN-MOWER.

1,201,878.  Specification of Letters Patent.  Patented Oct. 17, 1916.

Application filed April 25, 1916. Serial No. 93,471.

*To all whom it may concern:*

Be it known that I, JAMES H. SAUNDERS, a citizen of the United States, residing at New York, in the county of New York and State of New York, have invented new and useful Improvements in Lawn-Mowers, of which the following is a specification.

This invention relates to lawn mowers and has for its primary object the provision of reciprocating cutting apparatus which may be used at the desire of the operator in combination with revolving cutting apparatus and adjusted vertically so as to effect a close cut of such weeds that cannot be satisfactorily cut by the revolving apparatus.

With the above and other objects in view which will appear as the nature of the invention is better understood, the same consists in the improved construction and novel arrangements of parts which will be hereinafter fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

In the drawings:—Figure 1 is a side elevation of a lawn mower showing the application of the invention thereto. Fig. 2 is a top plan view of a portion of the reciprocating cutting apparatus and the driving means therefor. Fig. 3 is a perspective view of the same, the driving means being removed.

There are many weeds, such as those known as dandelions and the like which cannot be removed from the lawn by the well known revolving cutting apparatus, yet, for various reasons such apparatus is found desirable in many instances. However, I contemplate providing an attachment for revolving cutting apparatus of a lawn mower such as the one illustrated at 1, in the present drawings. The mentioned lawn mower 1, is of well known construction, aside from certain slight changes which are made therein to accommodate my attachment and therefore only the essentials of the machine will be described. The machine carries a revolving reel 2, which may be operated in any suitable manner and supported from a frame 3.

The attachment 4, forming my invention consists of a finger bar 5, and a reciprocating cutter bar 6, having cutting teeth 7. The finger bar is provided with vertically rising end extensions 8, which are apertured at 9, for the reception of clamping bolts 10, the latter being extended through vertical elongated slots 11, in the sides of the frame 3, as shown in Fig. 1. Incident to this construction, it will be observed that the bar 5, and the reciprocating knife may be adjusted in a vertical direction relatively of the ground so that a very close cut may be effected as desired.

The bar 6, is provided with a pitman rod 12 having a passage 13, therein at its outer end which adjustably receives an extension 14, on a revolving crank arm 15. The mentioned crank arm is secured to one end of a driving shaft 16, the latter having a gear wheel 17, which is normally free to revolve independently of the shaft and it is designed to intermesh with a driving gear wheel 18, on the axle 19, of the lawn mower. A sliding clutch element 20, on the driver shaft is adapted to co-act with a similar clutch element 21, upon the gear wheel 17, whereby the shaft 16, may be made to revolve at the desire of the operator. The pitman 12, is formed of sections $12^a$ and $12^b$, which may be adjusted over one another and normally held fixed by the fastenings $12^c$. Thus the pitman may be extended or contracted longitudinally to compensate for vertical adjustment of the cutter bar.

The reciprocating cutting apparatus is located directly at the front of the revolving apparatus and it may be rendered respectively operative and inoperative by a clutch lever 22, pivoted to the frame 3, and provided with a dog 23, which may be brought into locking engagement with a rack bar 24, on said frame.

What is claimed as new is:—

1. A lawn mower having reciprocating cutting apparatus, means for supporting said reciprocating apparatus for vertical adjustment, a driver mechanism for said reciprocating apparatus, means included therein for compensating for the vertical adjustment of said apparatus and consisting of an adjustable pitman rod connected with said apparatus.

2. A lawn mower having reciprocating cutting apparatus, means for adjusting the same vertically, a longitudinally extensible pitman rod connected with said apparatus and means for operating the pitman rod.

In testimony whereof I affix my signature in presence of two witnesses.

JAMES H. SAUNDERS.

Witnesses:
 ANNA V. DOYLE,
 CHRIS FEINLE, Jr.

Copies of this patent may be obtained for five cents each, by addressing the "Commissioner of Patents, Washington, D. C."